Feb. 23, 1971    J. W. SLEMMONS ET AL    3,564,911
BOND TESTING MACHINE HAVING AN ADJUSTABLE
AND SELF-CENTERING HOOK
Filed March 17, 1969    2 Sheets-Sheet 1

INVENTORS
JOHN W. SLEMMONS
BROOKS T. HOGAN
BY
Robert G. Rogers
ATTORNEY

United States Patent Office 3,564,911
Patented Feb. 23, 1971

3,564,911
BOND TESTING MACHINE HAVING AN ADJUSTABLE AND SELF-CENTERING HOOK
John W. Slemmons, Orange, and Brooks T. Hogan, Manhattan Beach, Calif., assignors to North American Rockwell Corporation
Filed Mar. 17, 1969, Ser. No. 807,811
Int. Cl. G01n 3/14
U.S. Cl. 73—95                                    7 Claims

ABSTRACT OF THE DISCLOSURE

A self-centering hook assembly is suspended from one end of a pivoting balanced beam. The beam is loaded with a weight as a function of a required pulling force to be applied by said hook assembly. A test circuit is moved under the hook and the beam is tilted to permit the hook to engage an interconnect wire of a microelectronic circuit. A mechanical stop is provided so that the hook is lowered the minimum distance required to engage a conductor without contacting the substrate of the circuit.

After a wire has been engaged, the beam is permitted to pivot upwards in response to the applied load. An upper mechanical stop is provided to prevent excessive pivoting and to test the vertical slack of the conductor. If the bond of the interconnect wire or its vertical slack is within the required limits, the upper mechanical stop is not contacted and a successful test is indicated. If the mechanical stop is contacted, an unsuccessful test is indicated.

The machine also includes means for adjusting the upper and lower mechanical stops individually and jointly so that different amounts of vertical slack and bond strengths can be tested and to accommodate circuits having different substrate thicknesses.

BACKGROUND OF THE INVENTION

(1) Field of the invention

This invention relates to a bond testing machine and more particularly to such a machine in which the bond strength and slack of circuit interconnect wires are tested simultaneously by a self-centering and adjustable hook assembly.

(2) Description of prior art

The reliability of microelectronic systems is often dependent on the reliability of small diameter interconnect wires, or conductors, used to electrically connect semiconductor chips with the output leads of their protective packages. In order to improve the quality of the interconnecting wires, it is necessary to provide a bond test which can be used in connection with conventional production processes to eliminate the unreliably bonded wire without degrading or damaging the acceptable wires. It is also necessary to test the vertical slack of the wires to reject circuits having wires which would otherwise contact the top of a semiconductor package and cause an electrical short. The test should also be flexible enough to permit adjustments to be made to accommodate various circuit sizes, bond tests, and slackness tests.

The present invention provides a machine which overcomes the problems associated with testing interconnect conductors and provides means for improving the reliability of the test as described herein.

SUMMARY OF THE INVENTION

Briefly, the bond test machine comprises a self-centering and self-damping hook which is suspended from one end of a balanced beam disposed for pivoting about a pivot point between the extremities. A weight is attached to the other end of the beam as a function of a required hook pulling force. Means are included for raising and lowering the hook after an interconnect wire of the circuit has been positioned under the hook.

A lower stop is provided to prevent the hook from contacting the surface of the circuit, usually a semiconductor chip. An upper stop is provided for preventing the hook from being raised, after engaging a wire, to a height which would exceed the test requirements of the wire. For example, if the bond of the wire fails, or if the wire being tested has excessive slack, or looseness, in the vertical direction, the beam would continue to pivot until it stops due to its own mechanical limitations. The upper limit is provided to determine the point at which the lead has failed one or both the tests. If the upper limit is not reached, means are provided for indicating a successful test. However, if the upper contact is reached, a successful test indication is not given.

In the preferred embodiment, means are provided for jointly adjusting the upper and lower stops to accommodate circuits having different sizes. For example, if the thickness of a semiconductor chip varies, it is necessary to vary the lower stop to prevent the hook from contacting and possibly damaging the surface of the semiconductor chip. It would also be necessary to adjust the upper stop since the pull would be taken from a different lower stop position.

Means are also included for adjusting the upper and lower limits individually as required to conduct tests for different semiconductor chip thicknesses or package lid height.

Therefore, it is an object of this invention to provide an improved machine for testing the bond strength of wires which interconnect microelectronic circuits to output terminals of the circuit packages.

It is another object of this invention to provide an improved machine for testing the bond strength and vertical looseness of interconnecting wires to microelectronic circuits.

Still another object of this invention is to provide an improved bond testing machine for microelectronic wires which includes a self-centering and self-damping hook assembly.

A still further object of this invention is to provide an improved bond testing machine for detecting unreliable conductors without damaging the acceptable interconnect wires of a microelectronic circuit.

A still further object of the invention is to provide an improved bond testing machine in which upper and lower limits of vertical pull by the conductor engaging portion of the machine are individually and jointly adjustable to accommodate different circuits and to enable different tests to be conducted.

These and other objects of this invention will become more apparent when taken in connection with the description of the drawings, a brief description of which follows.

DESCRIPTION OF PREFERRED EMBODIMENTS

Figure 1:
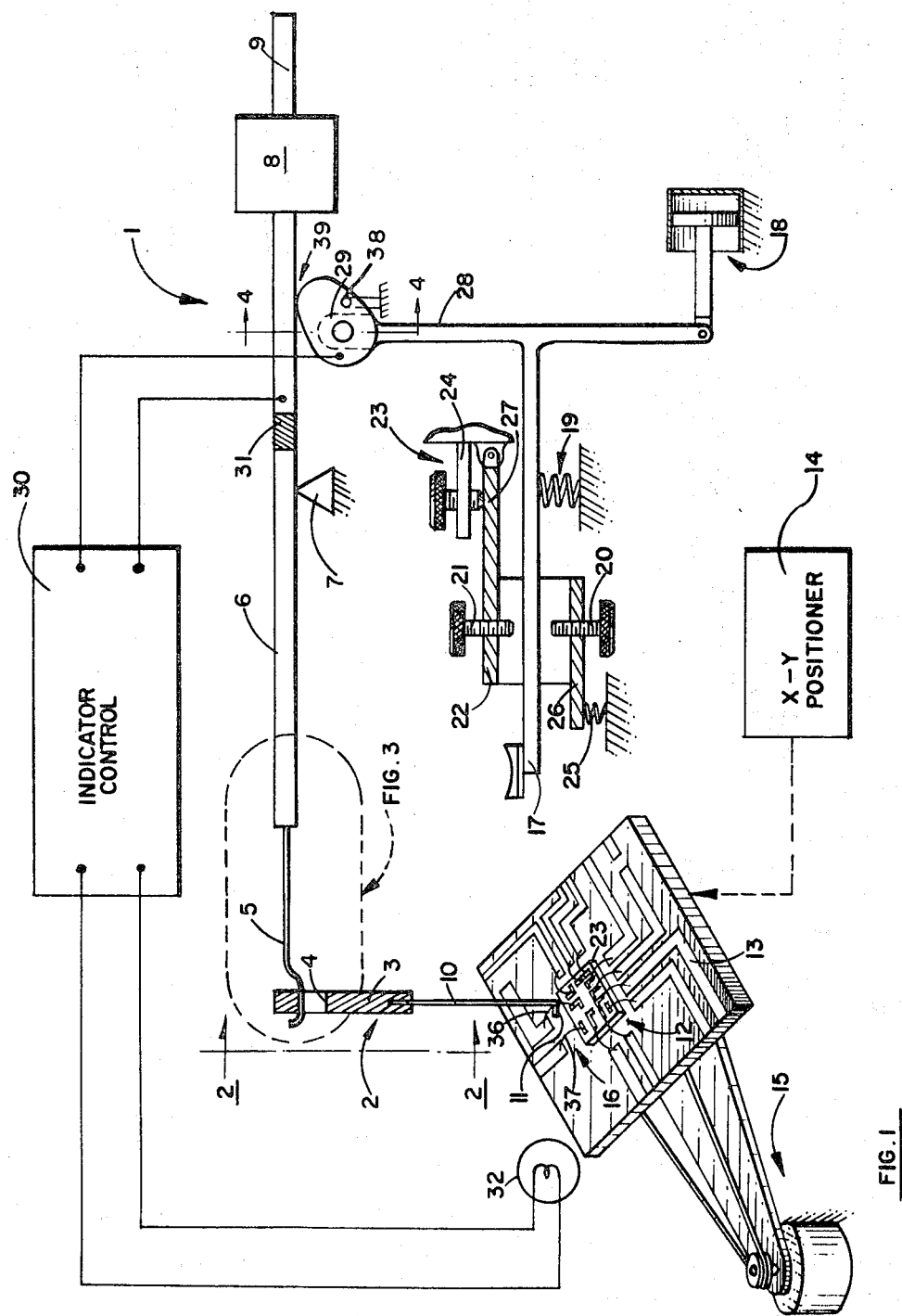
FIG. 1 is a partial schematic illustration of one embodiment of the invention.

FIG. 1 is an illustration of one embodiment of the bond test machine 1. For convenience, the machine 1 is shown in partial schematic form for convenience and ease of illustration. The omitted details such as covers, specific electrical contacts, base plates, microscopes for viewing the test, etc., are believed well-known to persons skilled in the art, therefore, it is not necessary to include such details.

The machine comprises hook assembly 2 which includes pear-shaped member 3 having an opening 4 which is used for suspending the hook assembly to the tip end 5 of balanced beam 6. The beam 6 pivots about pivot point 7 as a function of the weight 8 attached to the other end 9 of the beam. The hook assembly also includes a slender portion 10 which terminates in a hook tip 11 used to engage interconnect wires of the microelectronic circuit 12 disposed on partially illustrated substrate 13.

The substrate 13 and, therefore, the microelectronic circuit 12 is positioned along its x and y axes by X and Y positioning means 14. During the test, the hook assembly 2 is raised and the circuit 12 is rotated into position under the hook tip 11 by motor 15. The hook assembly 2 is raised while the motor is rotating the circuit to prevent damage to the interconnect wires identified generally by numeral 16 by the hook tip.

The assembly is raised or lowered by means of actuating arm 17 which is connected to damping means 18 for controlling the rate at which the hook assembly is raised and lowered during a test. Spring means 19 is connected between the actuating arm 17 and a base surface for urging the arm upwards after the hook assembly 2 has been lowered and the tip 11 has contacted a conductor.

Threaded screws 20 and 21 engaged within housing 22 provide upper and lower mechanical stops for the actuating arm 17. The lower mechanical stop is necessary to prevent the tip 11 of the hook assembly 2 from being lowered to contact with the surface of the semiconductor chip 23. The lower limit may be determined empirically as a function of the size of a particular circuit. The upper limit is necessary to prevent the beam 6 from pivoting excessively about pivot point 7 in the event a bond fails or in the event there is excessive vertical looseness or slack in the wire being tested. It is adjustable as a function of the weight 8 connected to end 9 of the balanced beam and as a function of the allowable vertical pull by hook assembly 2.

The machine also includes threaded screw 23 engaged in plate 24 which enables the upper and lower limits to be adjusted jointly either upward or downward as a function of, for example, a change in the thickness of a circuit substrate. In other words, if the test for bond strength and vertical looseness remains unchanged but the thickness of substrate 13 or chip 23 increases or decreases, the upper and lower limits must be adjusted jointly. By changing the position of screw 23 in plate 24, housing 22 is raised or lowered. Spring 25 connected between the edge 26 of the housing 22 and a base, urges the housing upward against the tip 27 of the threaded screw 23.

Actuating arm 17 is connected to a vertically extending member 28 which is connected to rotating cam member 29 at one end. The damping means 18 is connected to the other end of the member 28. Cam member 29 rotates against the bottom surface of beam 6 when actuating arm 17 is raised or lowered.

The pivot point of the actuating arm 17-cam member 29 assembly is established by fixed pin 38. The cam member 29 rotates, or pivots about the pin 38 which may be mounted on the base or operating table (not shown) of the machine 1.

The cam member 29 is driven or pivoted as indicated by the up or down movement of member 28 when actuating arm 17 is pushed downward, for example, by an operator, and is urged upward by the force of spring 19. When arm 17 is depressed, cam member 29 rotates clockwise against the bottom of beam 6 and causes the hook assembly 2 at the unloaded end of the beam to be lowered. When the arm 17 is released, usually slowly by an operator, the cam member 29 rotates counter clockwise against the bottom of beam 6 and the hook assembly 2 which is raised for testing the bond strength and vertical slackness of a wire.

The cam member, therefore, rotates through a predetermined angle as a function of the stops provided by screws 20 and 21. The upper and lower stops can be jointly adjusted by screw 23. The beam 6 is supported on the cam member 29 as shown at point 39 for the beam position illustrated by FIG. 1.

The cam member and the portion above the cam are electrically connected to provide electrical continuity into the test light control circuit 30 of the machine 1. The cross hatched portion 31 of the beam is included to indicate that the remainder of the beam is electrically insulated from the conductive portion shown in contact with cam 29. Cam 29 is also assumed to be electrically conductive. In one embodiment, the outer surface of the beam and the cam could be coated with a conductive material. In the alternative, the cam and beam portion above the cam could be comprised of a conductive metal.

Light 32 is shown connected to the output terminals of test light control means 30 for indicating the success or failure test as described subsequently. Circuitry for controlling light 32 is shown in block form since it is believed that details such as relays, etc. for controlling the light, is well known to persons skilled in the art.

Figure 2:
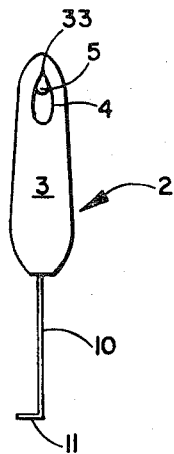
FIG. 2 is a front view of the self-centering and self-damping hook used by the FIG. 1 system.

FIG. 2 is a front view of the hook assembly 2 showing the pear-shaped portion 3 including opening 4 for engaging tip end 5 of the balanced beam. Tip 11 is also shown more clearly. The hook is automatically self-centering by means of the V-shaped portion 33 of opening 4. The top of the tip end 5 has an inverted V configuration for mating with portion 33 of opening 4. Regardless of the movement of the tip 11, the assembly will always re-center itself around tip 5 of the balanced beam. If the opening had been square or U-shaped, it would be possible for the tip 11 to have an angular position offset from the vertical. As a result, the pull exerted on wires 16 would be at an angle other than a right angle and the vertical component would be reduced accordingly. A sucessful test might be indicated although, in fact, the bond could be defective.

Oscillations which often occur when the hook is being raised or lowered are quickly damped out by the pear-shaped member 3, which may be comprised of a piece of metal stamped in the configuration shown. If other hook assembly configurations were used which did not include means for damping out the oscillations, it would be possible for the tip 11 to swing into contact with other wires or components being tested and cause damage. Damping occurs by virtue of offsetting the center of gravity in the member 3.

Figure 3:
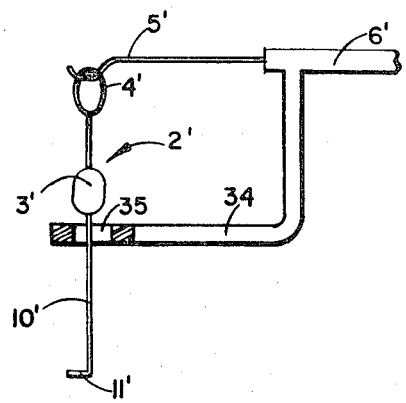
FIG. 3 is a different embodiment of a self-centering and self-damping hook for use by the FIG. 1 assembly.

FIG. 3 shows another embodiment of a self-centering and self-damping hook assembly 2'. The hook assembly includes ring 4' and metal ball 3' which replaces the pear-shaped portion 3 shown in FIG. 2. Tip 11' is connected at the end of the hook assembly 2'. L-shaped member 34 is connected at one end to member 6'. Ring magnet 34 is connected to one end of the member 34. Member 35 is L-shaped so that its other end is connected to beam member 6' for being raised or lowered simultaneously with the beam 6'. The magnet includes a central opening for accommodating portion 10' of the hook assembly 2'. The magnet in conjunction with ring 4' always centers the tip 11' along the vertical axis and provides for damping oscillation for reasons previously described. It is pointed out that the ball 3', magnet 34, and portion 10' must be selected relative to each other so that the force of the magnet will be insufficient to pul the ball 3' and portion 10' into contact with the inner surface of magnet 34.

In operation, the semiconductor circuit 12 on substrate 13 is placed on a rotating device, shown generally by the mechanical link to motor 15. A vacuum, or magnet or other mechanical means may be used to secure the semiconductor circuit to the device. Ordinarily, a microscope is used to view the test since the element are relatively small. For convenience, however, the microscope has been eliminated from FIG. 1.

The X-Y positioner 14 positions the circuit 12 under the hook assembly 2 which is in its raised position. Ordinarily, the positioner 14 moves the circuit 12 until the tip 11 is directly over an interconnect wire to be tested and is positioned approximately midway between the bonded extremities of the conductor.

Prior to initiating a test, a weight, for example 2 grams, is connected to the end of the balanced beam. After the circuit has been positioned at the desired location under the hook assembly, the actuating arm is pressed downward to lower the hook tip. When the tip is adjacent to a wire to be tested, the X-Y positioner is used to move the tip 11 under the wire. The arm is then raised to allow the hook assembly to pull upwards on the wire, for example, wire 36 as shown in FIG. 1. As the arm 17 is urged upward by spring 19, cam 29 rotates against the bottom surface of beam 6 and permits the beam to pivot about pivot point 7 for raising the hook. When the wire resists the predetermined load on the beam 6, the beam stops pivoting. However, the arm 17 continues to be urged upward so that cam 29 becomes disengaged, or disconnected, from beam 6. As a result, the electrical continuity of the circuit is broken and light 32 turns on to indicate that the wire has passed the test.

If the wire had not resisted the pull either because of a defective bond or because of the vertical slackness of the lead, the continuity would not have been broken and the light would not have turned on so that an unsuccessful test would have been indicated. An operator could view the wire through a microscope to determine whether or not the failure was due to a vertical slackness or due to an improper bond. As indicated earlier, vertical slackness could result in a short circuit against the cover of the microelectronic circuit package. A defective bond could result in an open circuit to that portion of the package.

After one wire has been tested, the arm 17 is lowered and the X-Y positioner removes the tip 11 from the wire. Subsequently, motor 15, for example a stepping motor, is actuated to rotate the circuit 12 clockwise or counterclockwise so that the hook assembly is positioned adjacent to another of the wires, for example, wire 37 shown in FIG. 1. Thereafter, the procedure is repeated. After each conductor of the microelectronic circuit is tested, the package is removed and a new package positioned in the test area.

We claim:
1. A wire bond strength tester comprising,
 a beam adapted to rotate about a pivot point, means to load one end of said beam by a predetermined amount,
 hook means suspended from the other end of said beam for engaging a test wire,
 cam means adapted to rotate through a predetermined angle and having a support surface for supporting one end of the beam in an initial position and adapted to move away from the initial position as said cam means rotates, whereby said one end of the beam will follow and contact said supporting surface unless restrained from rotation by the engagement of said hook means to said test wire, and
 electrical means to indicate when said one end of the beam breaks contact with said supporting surface.

2. The combination recited in claim 1 wherein said electrical means indicates if the movement of said beam is less than a predetermined distance for testing the vertical looseness of said test wire and for testing the bond strength of said wire.

3. The combination recited in claim 1 wherein said electrical means includes an electrical path through the loaded end of said beam and said cam means, said cam means becoming separated from said beam if the beam is restrained from following said cam means when the strength of the wire is greater than the load at said one end of the beam and when the vertical pull of said wire is less than a predetermined vertical distance.

4. The combination recited in claim 1 wherein said hook means includes an opening at the suspension point which has a configuration for preventing the tip from assuming an angle which deviates from the vertical.

5. The combination recited in claim 1 wherein said hook means includes a magnet means for holding said tip in a vertical direction.

6. The combination recited in claim 1 including upper and lower stops for limiting the movement of said beam, means for adjusting the upper and lower stops of said beam rotation for testing different wire bond strengths and different degrees of vertical looseness of wires.

7. The combination recited in claim 6 including means for jointly adjusting said upper and lower stops for testing wires on circuit boards having different thicknesses.

References Cited

UNITED STATES PATENTS

| | | | |
|---|---|---|---|
| 2,767,576 | 10/1956 | Seney | 73—144 |
| 3,127,766 | 4/1964 | Wolle | 73—95 |
| 3,344,662 | 10/1967 | Pruett | 73—103 |
| 3,443,425 | 5/1969 | Hunter | 73—101 |
| 1,837,577 | 12/1931 | Nessler | 73—95 |

FOREIGN PATENTS

| | | | |
|---|---|---|---|
| 1,071,375 | 12/1959 | Germany | 42K—49/02 |
| 575,227 | 4/1933 | Germany | 42K—22/01 |
| 88,161 | 12/1936 | Sweden. | |

JAMES J. GILL, Primary Examiner

J. WHALEN, Assistant Examiner

U.S. Cl. X.R.

73—150